United States Patent
Yoshida

[11] Patent Number: 5,970,794
[45] Date of Patent: Oct. 26, 1999

[54] SHOCK SENSOR

[75] Inventor: Yuki Yoshida, Tokyo, Japan

[73] Assignee: OKI Electric Industry Co., Ltd., Tokyo, Japan

[21] Appl. No.: 08/984,683

[22] Filed: Dec. 3, 1997

[30] Foreign Application Priority Data

Dec. 3, 1996 [JP] Japan .................................. 8-322712

[51] Int. Cl.$^6$ .................................................. G01P 15/00
[52] U.S. Cl. ................................. 73/514.09; 73/514.31; 324/207.21
[58] Field of Search .......................... 73/514.05, 514.09, 73/514.16, 514.31; 324/207.21, 207.22, 207.23, 207.24, 207.25, 207.26, 207.16; 338/32 R; 200/61.47, 61.45 M

[56] References Cited

U.S. PATENT DOCUMENTS

| | | | |
|---|---|---|---|
| 3,906,802 | 9/1975 | Nonaka et al. | 73/514.05 |
| 4,631,954 | 12/1986 | Mills | 73/151 |
| 4,676,103 | 6/1987 | Nakajima | 73/514.09 |
| 4,793,241 | 12/1988 | Mano et al. | 92/5 R |
| 4,948,929 | 8/1990 | Fukushima | 200/61.45 M |
| 4,984,463 | 1/1991 | Idogaki et al. | 73/514.08 |

FOREIGN PATENT DOCUMENTS

| | | |
|---|---|---|
| 0 293 784 | 12/1988 | European Pat. Off. . |
| 0 306 178 | 3/1989 | European Pat. Off. . |
| 0 419 041 | 3/1991 | European Pat. Off. . |
| 60-133370 | 7/1985 | Japan . |
| 6-229788 | 8/1994 | Japan . |
| 7-198738 | 8/1995 | Japan . |
| 8-029444 | 2/1996 | Japan . |

*Primary Examiner*—Hezron Williams
*Assistant Examiner*—Richard A. Moller
*Attorney, Agent, or Firm*—Venable; Robert J. Frank; Catherine M. Voorhees

[57] ABSTRACT

A shock sensor detects shocks from all directions in a plane. A coil produces a magnetic field. A magnetic fluid is sealed in a closed container located in the magnetic field. A magnetoresistive effect element is also is located in the magnetic field and opposes the magnetic fluid. The magnetic fluid moves relative to the magnetoresistive effect element when the magnetic fluid receives a shock. When the magnetoresistive effect element is subjected to a change in magnetic field, the resistance of the magnetoresistive effect element changes. The magnetoresistive effect element may be formed of four elements in a bridge configuration and the output of the bridge is processed in an output circuit. The output circuit outputs a sensor output when the magnetic fluid moves relative to the magnetoresistive effect element.

7 Claims, 7 Drawing Sheets

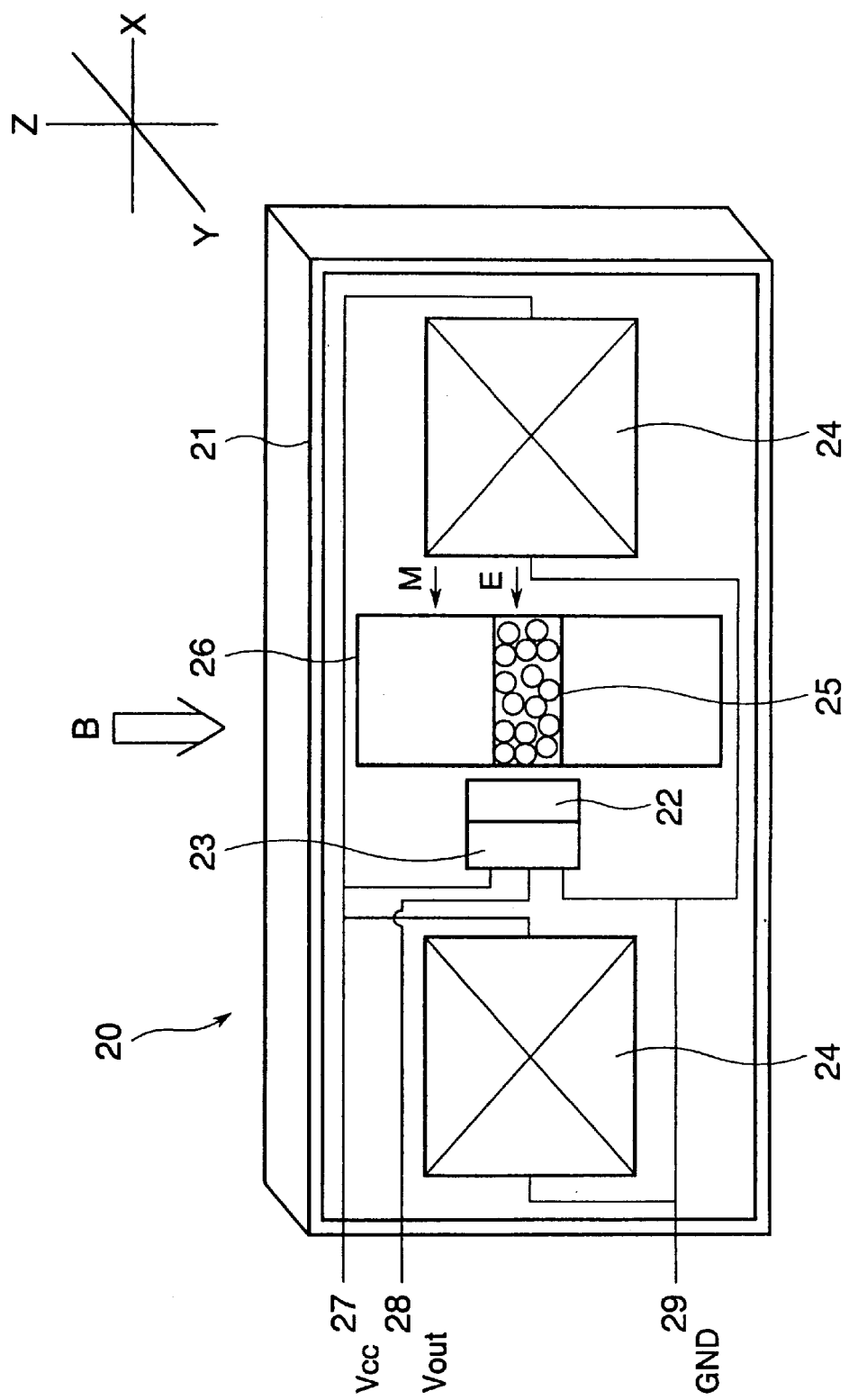

J = K

J ≠ K

J ≠ K

J ≠ K (DISPLACEMENT OF MAGNETIC FLUID WITH RESPECT TO MR ELEMENT)

(DISPLACEMENT OF MAGNETIC FLUID WITH RESPECT TO MR ELEMENT)

SHOCK SENSOR

BACKGROUND OF THE INVENTION

1. Field of the Invention

The present invention relates to a shock sensor and more particularly to a shock sensor for use in an air bag system for automobiles.

2. Description of Prior Art

An air bag system is employed in an automobile in order to protect the driver from a shock when the automobile collides with another automobile or the like. A shock sensor detects a shock and outputs a detection signal. The detection signal activates a firing device of an air bag which in turn causes the air bag to quickly inflate to protect the driver from the shock.

One such type of prior art shock sensor is disclosed in Japanese Patent Preliminary Publications No. 7-198738 and No. 8-29444.

FIG. 12 illustrates the general construction of a prior art reed switch type shock sensor, shown in JPA No. 8-29444, which is used in an air bag system for automobiles.

Referring to FIG. 12, a magnet 14 is housed in a case 11 and held in position by a spring 13. A reed switch 12 extends through the spring 13 and is loosely received in the magnet 14.

The reed switch 12 in the case 11 is open since the magnet 14 is located outside of an area in which the reed switch 12 is responsive to the magnetic field of the magnet 14.

A shock applied to the shock sensor, for example, in a direction shown by an arrow A imposes an acceleration on the mass of the spring 13. If the acceleration is large enough to overcome the resilient force of the spring 13, the magnet 14 moves into the area in which the reed switch 12 is responsive to the magnetic field of the magnet 14 to close its contacts.

However, a problem with the prior art reed switch type shock sensor is that the sensor is sensitive to shocks only in the direction shown by arrow A in FIG. 12. Another problem is that the sensitivity of the sensor varies with the weight, dimension, and magnetic flux density of the magnet 14. Further, the use of a reed switch as a shock-detecting element is an obstacle to miniaturizing the shock sensor.

SUMMARY OF THE INVENTION

An object of the invention is to provide a shock sensor which does not incorporate a magnet that suffers from variations in the characteristics such as size, magnetic flux density, and weight and which can detect shocks from almost all directions in a plane.

A coil produces a magnetic field. A magnetic fluid is sealed in a closed container located in the magnetic field. A magnetoresistive effect element is located in the magnetic field and opposes the magnetic fluid. When the magnetic fluid receives a shock, the magnetic fluid moves relative to the magnetoresistive effect element in a direction parallel to a plane in which the magnetoresistance lies. Thus, the magnetoresistive effect element is subjected to a change in the magnetic field, so that the resistance of the magnetoresistive effect element changes accordingly. The magnetoresistive effect element may include four elements electrically connected in a bridge configuration and the output of the magnetoresistive effect element is processed by an output circuit. The output circuit outputs a sensor output in response to an applied shock.

Further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given hereinbelow and the accompanying drawings which are given by way of illustration only, and thus are not limitative of the present invention, and wherein:

FIG. 1 illustrates a construction of a shock sensor according to a first embodiment of the invention;

DETAILED DESCRIPTION OF THE INVENTION

First Embodiment

Figure 2A:
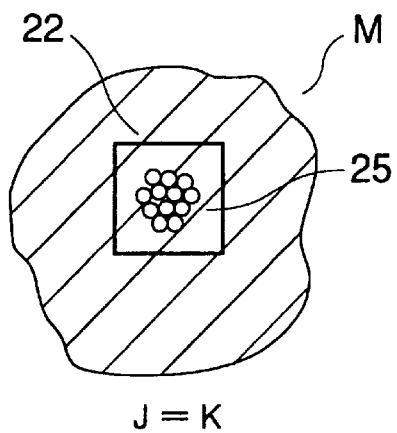
FIGS. 2A–2D illustrate the positional relationships between the magnetoresistance and the magnetic field M of the magnet.
Figure 2B:
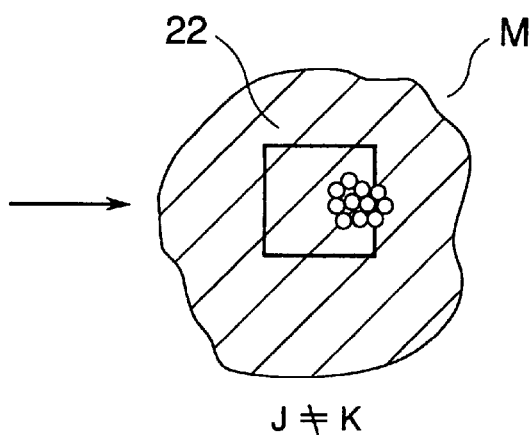
Figure 2C:
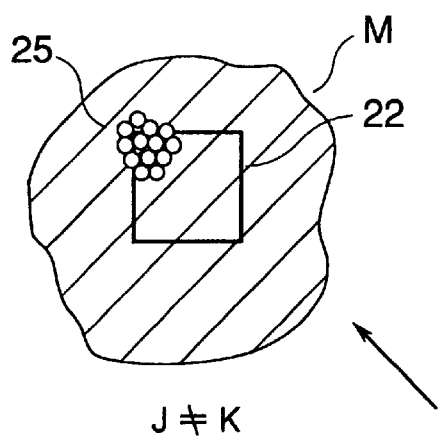
Figure 2D:
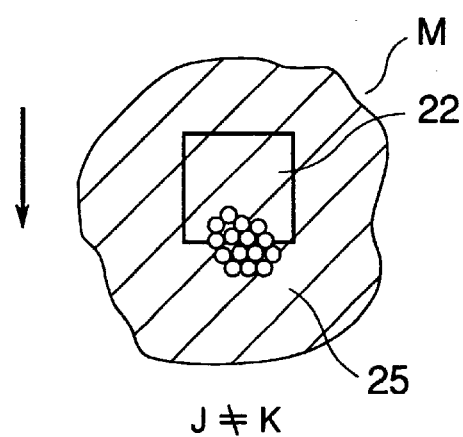

FIG. 1 illustrates a construction of a shock sensor according to a first embodiment.

The shock sensor of the first embodiment can be used in place of a prior art reed switch type shock sensor.

Referring to FIG. 1, the shock sensor 20 includes a magnetoresistive effect element 22, shaper 23 that reforms the output of the magnetoresistive effect element 22, coil 24 that applies a bias magnetic field M to the magnetoresistive effect element 22, magnetic fluid 25, and container 26 that is closed to seal the magnetic fluid 25, all being accommodated in a case 21.

When no shock is applied, to the shock sensor 20, a voltage Vcc is applied to the coil 24 so that the coil 24 produces a magnetic field in a direction shown by arrow E. The magnetic fluid 25 is attracted to the central area of the magnetic flux produced by the coil 24 and is collected to the middle portion of the container 26 where the magnetic fluid 25 is at its neutral position. The neutral position is a position where the magnetic fluid 25 is at rest over the magnetoresistive effect element 22 when no shock is applied thereto.

There are provided a power receiving terminal 27, output terminal 28, and ground terminal 29 on the case 21, and these terminals are exposed on the outer surface of the case 21.

Figure 3:
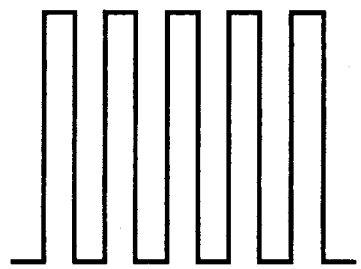
FIG. 3 illustrates a meander pattern of a magnetoresistive effect element.

The magnetoresistive effect element 22 is a resistor whose electrical resistance varies in accordance with the magnetic field strength in which the magnetoresistive effect element 22 is placed. A magnetoresistive effect element is a thin film of an alloy whose major composition is a ferromagnetic metal and whose pattern is, for example, a meander line as shown in FIG. 3. When a magnetoresistive effect element is magnetized by an external magnetic field, the resistivity of the magnetoresistive effect element varies.

Figure 4:
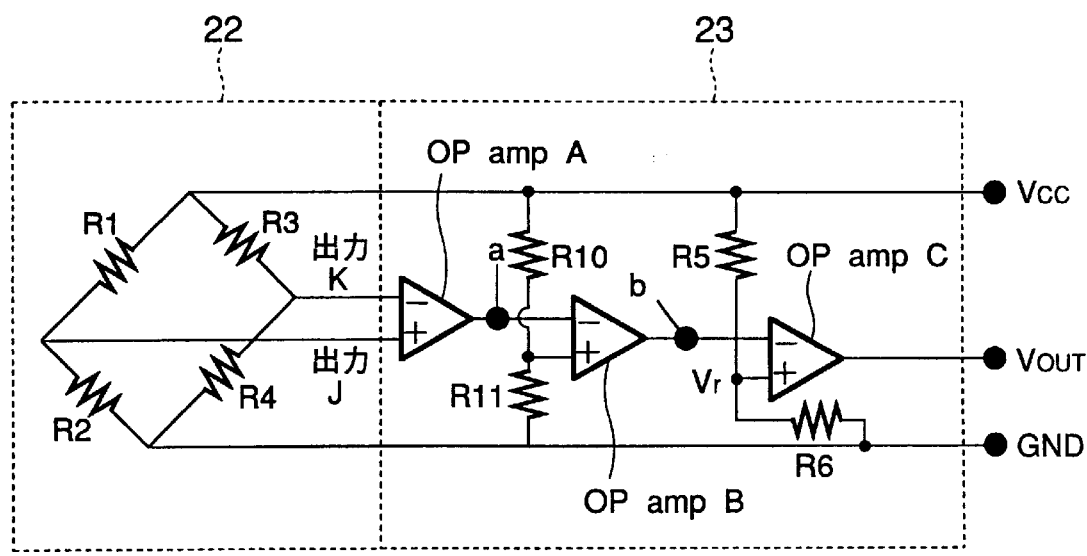
FIG. 4 is a schematic diagram showing a configuration of the shaper.

FIG. 4 is a schematic diagram showing a construction of the shaper 23.

Referring to FIG. 4, the magnetoresistive effect element 22 is formed of elements R1–R4 and is placed in the magnetic field generated by the coil 24. The elements R1–R4 are aligned at predetermined intervals and are connected in a bridge configuration, each element forming one arm of the bridge. The junction of R1 and R3 is connected to the supply voltage Vcc and the junction of R2 and R4 is connected to the ground GND. Output J is obtained from the junction of R1 and R2 and output K is obtained from the junction of R3 and R4.

In order for the bridge circuit to be balanced, the resistances of the elements R1–R4 are related so that R1/R2=R3/R4. The simplest case is when R1=R2=R3=R4. The elements R1–R4 each have an electrical resistance in the range from 2 to 3 KΩ.

It is to be noted that at least one of the elements R1–R4 must be an MR element and the other elements may be ordinary resistors. The elements R1–R4 may be arranged in a plane normal to the direction E of the magnetic field M or in a plane parallel to the direction E of the magnetic field M. Moreover, the elements may also be aligned in the direction E of the magnetic field M in any way as far as the bridge becomes unbalanced when the magnetic fluid 25 displaces with respect to the magnetoresistive effect element 22.

FIGS. 2A–2D illustrate the positional relationships between the elements R1–R4 and the magnetic fluid 25 in the magnetic field M of the coil 24. Shocks applied in directions shown by arrows cause the magnetic fluid 25 to move in the directions shown by arrows so that the bridge circuit becomes unbalanced.

Referring to FIG. 4, an operational amplifier A is a differential amplifier, an operational amplifier B is an inverse-logarithmic amplifier, an operational amplifier C is a voltage comparator, and the resistors R5 and R6 form a voltage divider to provide a reference voltage Vr. The amplifier C outputs a sensor output Vout. There are provided a power receiving terminal Vcc, ground terminal GND, and output terminal Vout.

The output J is fed to an inversion terminal of the operational amplifier A and the output K is input to an inversion terminal. The operational amplifier A amplifies the difference between the outputs J and K.

The output of the operational amplifier A is input to an inversion terminal of the operational amplifier B and the non-inversion terminal of the operational amplifier B is connected to the junction of bias resistors R10 and R11. The operational amplifier B performs inverse-logarithmic amplification of the output of the operational amplifier A.

An inversion terminal of the operational amplifier C receives the output of the operational amplifier B and a non-inversion terminal of the operational amplifier C receives a reference voltage Vr on the junction of the resistors R5 and R6. The operational amplifier C compares the output of the operational amplifier B with the reference voltage Vr and outputs an amplified difference between the two inputs thereto, as an output Vout.

Voltages are applied to various terminals so that the operational amplifiers A, B, and C can operate properly.

The operation of the shock sensor of the aforementioned construction will now be described.

As shown in FIG. 1, when the shock sensor 20 receives a shock in a direction in a plane including Y and Z axes, the magnetic fluid 25 moves out of its neutral position if the shock is large enough to overcome the magnetic attraction which attracts the magnetic fluid 25. Therefore, the magnetoresistive effect element 22 is subject to changes in magnetic field.

Figure 5:
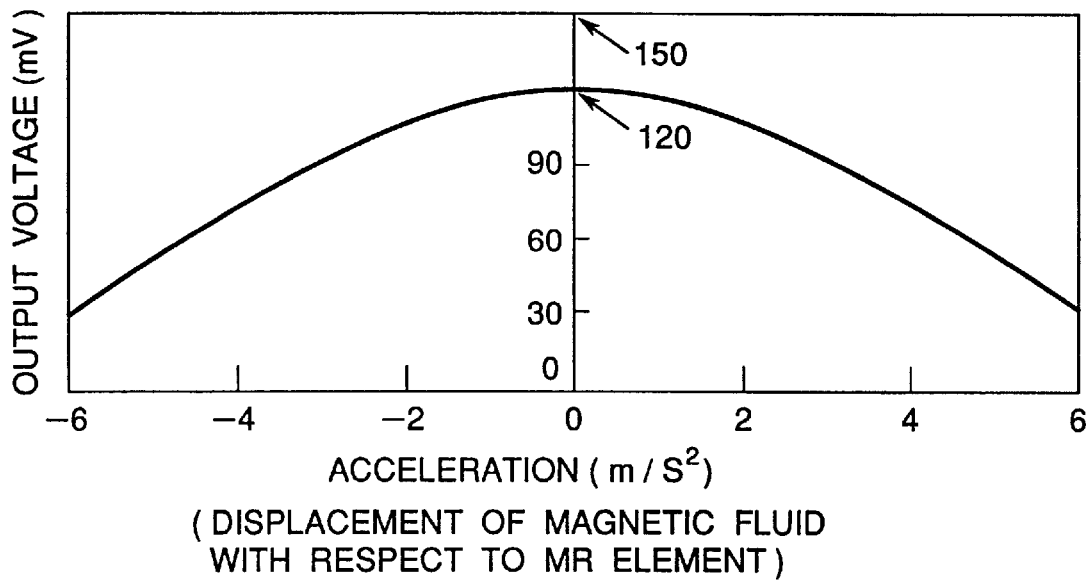
FIG. 5 shows the output of the operational amplifier A of FIG. 4.

A change in the magnetic field applied to the magnetoresistive effect element 22 causes changes in the outputs J and K of the bridge circuit of elements R1–R4. The operational amplifier A amplifies the difference between the outputs J and K and outputs an output voltage at point a as shown in FIG. 5. The output voltage varies in accordance with the acceleration applied to the shock sensor, i.e. the displacement of the magnetic fluid with respect to the magnetoresistive effect element 22.

Figure 6:
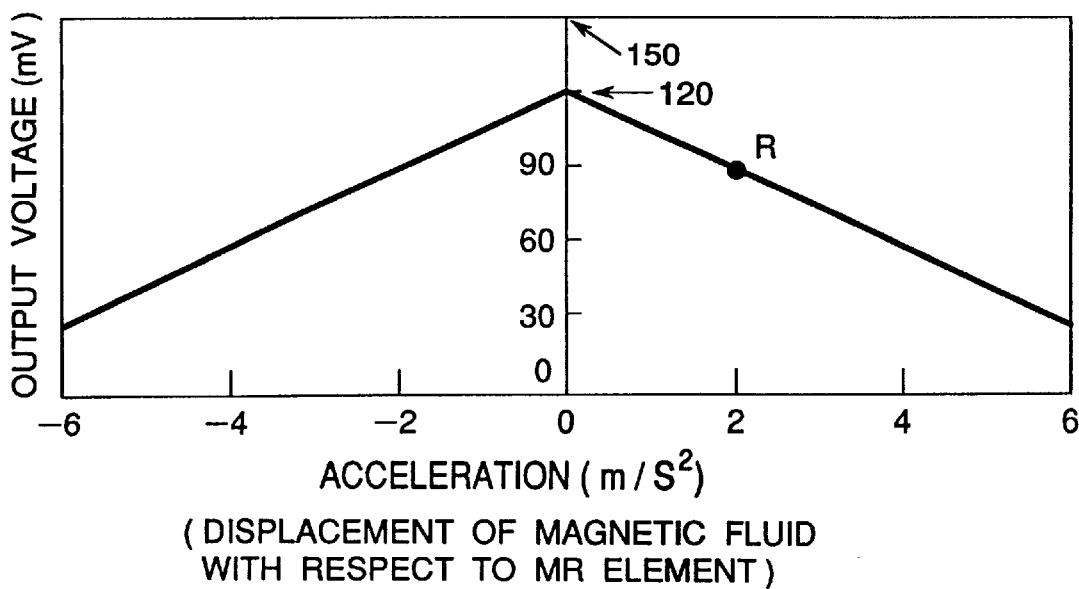
FIG. 6 illustrates the output of the operational amplifier B of FIG. 4.

The operational amplifier B receives the output of the operational amplifier A and amplifies it inverse-logarithmically. FIG. 6 illustrates the output of the operational amplifier B, showing the output which changes linearly with acceleration applied to the shock sensor.

The output of the operational amplifier B is then input to an inversion input of the operational amplifier C. The operational amplifier C compares the input on the inversion input with the reference voltage Vr, and outputs a signal of a logic level "1" if the input from the operational amplifier B is lower than the reference voltage Vr and a signal of a logic level "0" if the input from the operational amplifier B is higher than the reference voltage Vr.

Since the shock sensor 20 according to the first embodiment does not use a permanent magnet, characteristics of the sensor are free from any influences of the variations of the weight, dimension, and magnetic flux density of the magnet.

In addition, the sensor is not only sensitive to unidirectional shocks, but is capable of detecting shocks from all directions in a plane in which the Y-axis and Z-axis lie.

Thus, when the shock sensor of the first embodiment is applied as a sensor to, for example, an air bag system for automobiles, the shock sensor can detect shocks from many directions, increasing reliability of the air bag system.

Second Embodiment

Figure 7:
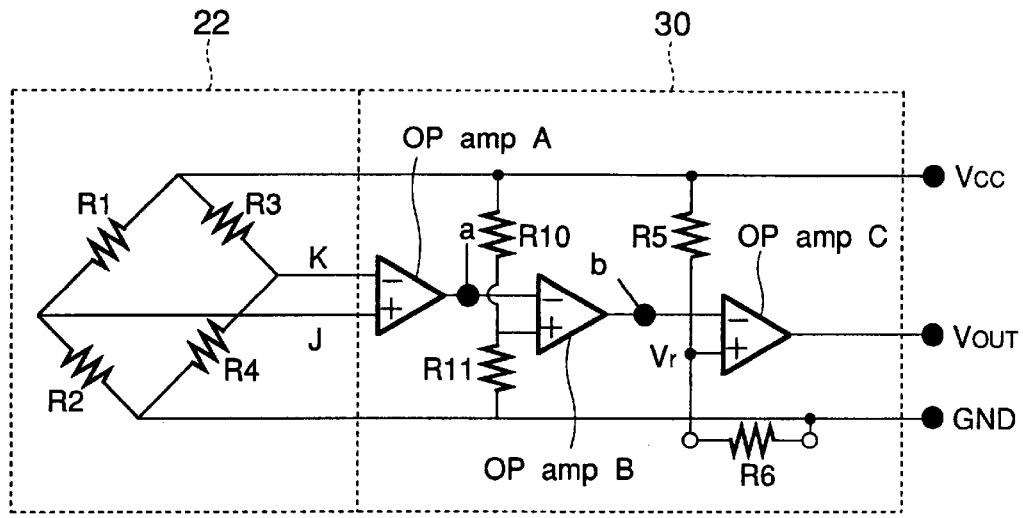
FIG. 7 illustrates a configuration of a shaper for used in a shock sensor of a second embodiment.

FIG. 7 illustrates a configuration of a shaper used in a shock sensor of a second embodiment. Elements similar to those in FIG. 4 have been given the same references and description thereof is omitted.

In the second embodiment, the shaper includes external resistors which are replaceable or adjustable. Selecting the resistances of the resistors allows setting of a proper operating point of the shock sensor.

Referring to FIG. 7, resistors R5 and R6 provide a reference voltage Vr which is supplied to the non-inversion terminal of the operational amplifier C. The resistors R5 and R6 have a resistance of about 5 kΩ. The resistor R6 is a variable resistor or replaceable resistor. The resistor R6 may include a plurality of resistors which are selectively used.

The operation of a shock sensor employing a shaper 30 of the aforementioned construction will be described.

The reference voltage applied to the non-inversion terminal of the operational amplifier C may be set by varying the resistor R6. Varying the resistor R6 allows setting of the threshold point of the sensor at which the shock sensor outputs a sensor output of a logic level "1" or "0" in accordance with the changes in the outputs J and K of the magnetoresistive effect element 22.

For example, the operating point of the operational amplifier C is set at point R on the curve in FIG. 6. The sensor will be activated only when the magnitude of a shock applied to the sensor overcomes an acceleration corresponding to point R.

As described above, the second embodiment is of a construction where the shaper 30 of the magnetoresistive effect element 22 includes a variable or replaceable resistor R6 so that the sensitivity of the shock sensor may be adjusted.

Third Embodiment

Figure 8:
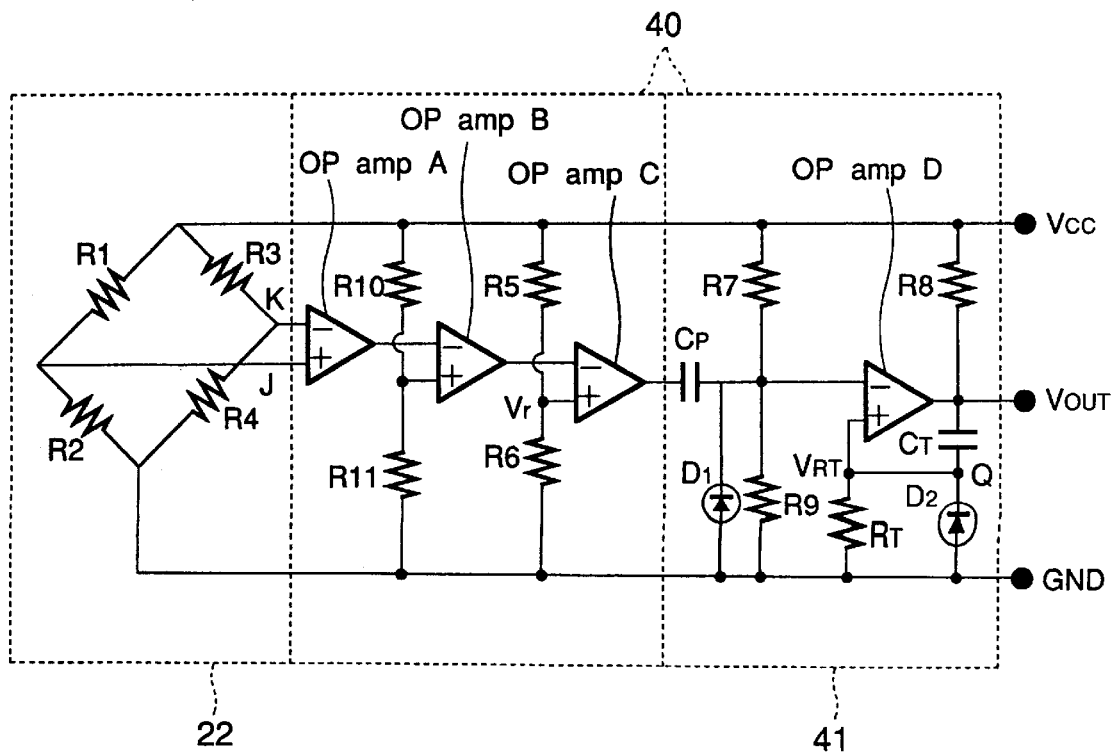
FIG. 8 is a schematic diagram illustrates a construction of a shaper for use in a shock sensor according to a third embodiment.

FIG. 8 is a schematic diagram illustrates a construction of a shaper for use in a shock sensor according to a third embodiment. Elements similar to those in FIG. 4 have been given the same references and description thereof is omitted.

The third embodiment includes a timer circuit 41 such as a monostable multivibrator incorporated in the shaper. The timer 41 outputs an output having a predetermined time length.

Referring to FIG. 8, a monostable multivibrator (timer circuit) 41 receives the output of the operational amplifier C of the shaper 40, the multivibrator 41 including an operational amplifier C, capacitors Cp and Ct, diodes D1 and D2, and resistors $R_T$, and R7–R9.

The operation of a shock sensor having a shaper of the aforementioned configuration will be described.

The elements R1–R4, operational amplifier A, operational amplifier B, and operational amplifier C are arranged in a manner similar to those shown in FIG. 4.

Figure 9:
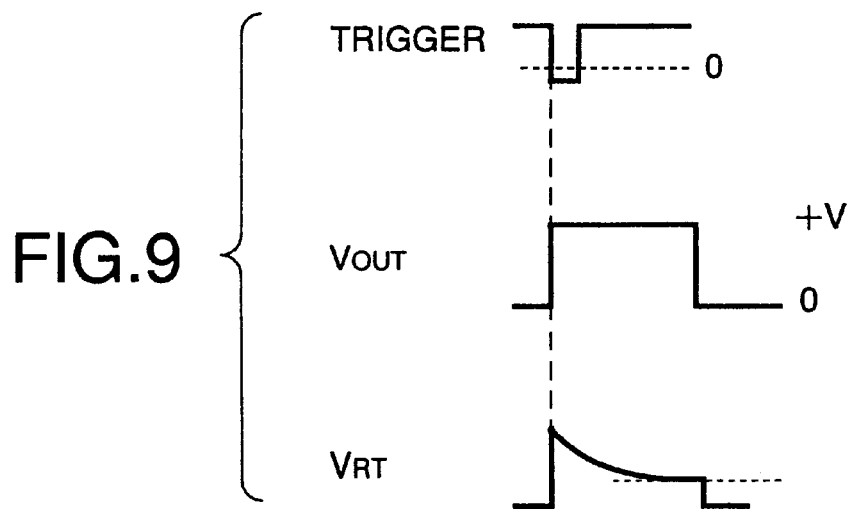
FIG. 9 illustrates waveforms of a trigger signal and sensor output Vout.

In the third embodiment, the resistors R7 and R9 are of the same resistance. When a shock is applied in a direction shown by arrow B in FIG. 1 to the shock sensor 20, the operational amplifier A amplifies the output of the magneresistive effect element 22 in FIG. 8, and the operational amplifier B inverse-logarithmically amplifies the output of the operational amplifier A. The output of the operational amplifier B is directed to the inversion terminal of the operational amplifier C and a reference voltage Vr is applied to the non-inversion terminal. When the input to the inversion terminal exceeds the reference voltage Vr, the operational amplifier C outputs a negative trigger pulse as shown in FIG. 9 via a capacitor Cp to the inversion terminal operational amplifier D. Therefore, the output Vout goes up to +V as shown in FIG. 9.

The voltage at point Q also increases so that the voltage $V_{RT}$ across the resistor $R_T$ increases as shown in FIG. 9. The current flowing through the $R_T$ and R8 charges up the capacitor $C_T$ so that the voltage $V_{RT}$ across the resistor $R_T$ will decrease with time as shown in FIG. 9. Since R7=R9, when the voltage $V_{RT}$ becomes half its initial value, the voltage $V_{RT}$ is below the voltage at the inverted terminal, the $V_{RT}$ going down to zero volts again.

Figure 10A:
FIGS. 10A–10C illustrate various waveforms of the trigger signal which may be supplied to the operational amplifier D.
Figure 10B:
Figure 10C:
Figure 11:
FIG. 11 illustrates the output of the operational amplifier D.
Figure 12:
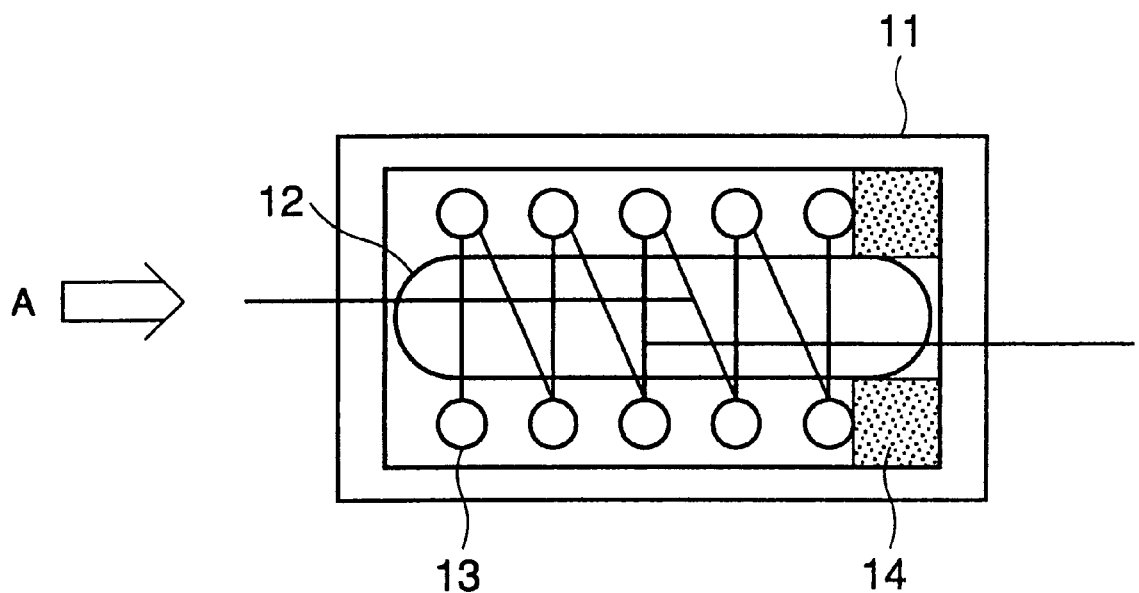
FIG. 12 illustrates a general construction of a prior art reed switch type shock sensor.

The timer outputs the waveform shown in FIG. 11 when triggered by the first negative going edge of any one of the waveforms shown in FIGS. 10A–10C. Selecting the values of capacitors and resistors allows adjusting of the height and duration of the waveform shown in FIG. 11.

The shock sensor according to the third embodiment having a monostable multivibrator 41 is capable of outputting a waveform of a predetermined time duration irrespective of the shape of trigger pulse.

The shock sensor of the embodiment will increase reliability of an air bag system for use in automobiles.

The shock sensor of the embodiment is applicable not only to air bag systems for automobiles but also to any apparatuses which need to detect shocks.

The aforementioned embodiments are not limited to the types of magnetoresistive effect element, magnetic fluid, and Op amps and the number of these parts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shock sensor, comprising:

a coil producing a magnetic field;

a magnetoresistive effect element placed in the magnetic field produced by said coil;

a magnetic fluid sealed in a closed container located in the magnetic field, said magnetic fluid being held by a magnetic force of the magnetic field to oppose said magnetoresistive effect element, said magnetic fluid moving with respect to said magnetoresistive effect element only when the magnetic fluid receives a shock which overcomes the magnetic force; and an output circuit, processing an output signal of said magnetoresistive effect element, said output circuit outputting a first sensor output when said magnetic fluid moves with respect to said magnetoresistive effect element, and a second sensor output when said magnetic fluid does not move with respect to said magnetoresistive effect element.

2. The shock sensor of claim 1, wherein said output circuit includes a circuit element for adjusting a characteristic of said output circuit.

3. The shock sensor of claim 2, wherein said characteristic is an operating point of the shock sensor corresponding to a magnitude of a shock for which said output circuit outputs the first sensor output.

4. The shock sensor of claim 2, wherein said circuit element is an external resistor which is variable or replaceable.

5. The shock sensor of claim 1, wherein said magnetoresistive effect element includes four elements aligned at predetermined intervals and electrically connected in a bridge configuration, each element being a predetermined distance away from a central area of the magnetic field.

6. The shock sensor of claim 1, wherein said output circuit includes a circuit which outputs a signal having a predetermined duration, said circuit being a timer circuit.

7. The shock sensor of claim 6, wherein said timer circuit is a monostable multivibrator.

* * * * *